(12) United States Patent
Chang

(10) Patent No.: US 8,719,640 B2
(45) Date of Patent: May 6, 2014

(54) MOUSE MOTION TRAJECTORY TESTING SYSTEM

(75) Inventor: Pei-Ming Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 419 days.

(21) Appl. No.: 13/241,870

(22) Filed: Sep. 23, 2011

(65) Prior Publication Data

US 2013/0019127 A1    Jan. 17, 2013

(30) Foreign Application Priority Data

Jul. 15, 2011   (TW) .............................. 100125113 A

(51) Int. Cl.
*G06F 11/00* (2006.01)

(52) U.S. Cl.
USPC ................ 714/44; 710/15; 345/163; 345/166

(58) Field of Classification Search
CPC . G06F 3/03543; G06F 3/038; G06F 11/2221; G06F 3/01; G06F 3/0304; G06T 7/20
See application file for complete search history.

(56) References Cited

U.S. PATENT DOCUMENTS 8,102,372 B2 * 1/2012 Chang et al. .................. 345/166

FOREIGN PATENT DOCUMENTS

CN         102915266       *   2/2013

* cited by examiner

*Primary Examiner* — Scott Baderman
*Assistant Examiner* — Jason Bryan
(74) *Attorney, Agent, or Firm* — Kirton McConkie; Evan R. Witt

(57) ABSTRACT

A mouse motion trajectory testing system includes a testing fixture and an electronic calculator connected to the testing fixture. The testing fixture includes a testing base, a rotatable member under the testing base, and a controlling unit. The testing base is used for fixing the tested mouse thereon. The controlling unit is used for driving the rotatable member to be rotated for a preset number of revolutions at a preset speed, so that the tested mouse generates a motion signal. The electronic calculator has testing program for receiving the motion signal from the tested mouse, thereby judging whether the tested mouse is qualified or not.

10 Claims, 4 Drawing Sheets

MOUSE MOTION TRAJECTORY TESTING SYSTEM

FIELD OF THE INVENTION

The present invention relates to a testing system, and more particularly to a mouse motion trajectory testing system.

BACKGROUND OF THE INVENTION

With increasing development of scientific technologies, multimedia products and computers become essential in our daily lives. In the computer systems, input devices play important roles for communicating the computer and the user. The common peripheral input devices of the computer systems include for example mice, keyboards, microphones, or the like. Among these peripheral input devices, mice are the most prevailing because they are very easy-to-use and can comply with the usual practices of most users. When a mouse is held on the palm of a user's hand, the user may move the mouse to control movement of the cursor shown on the computer screen. As the cursor is moved, the motion trajectory of the mouse cursor is shown on the computer screen. As known, the operations of the mouse are highly dependent on the condition whether the quality control specifications of the mouse in the production line are conscientious or not. For example, the precision of the mouse motion trajectory is an important factor influencing the performance of operating the mouse FIG. 1 schematically illustrates the architecture of a conventional mouse motion trajectory testing system. The mouse motion trajectory testing system 1 comprises a testing fixture 11 and an electronic calculator 12. The testing fixture 11 comprises a testing base 111, a movable platform 112 and a controlling unit 113. The testing base 111 is used for fixing a tested mouse 2 thereon. The movable platform 112 is disposed under the testing base 111. In addition, the movable platform 112 may be moved relative to the testing base 111 in the direction D1, the direction D2, the direction D3 or the direction D4. The controlling unit 113 is electrically connected with the movable platform 112 for driving the movable platform 112 to be moved relative to the testing base 111 for a preset distance at a preset speed in a preset direction. As the movable platform 112 is moved relative to the testing base 111, a displacement sensor (not shown) of the tested mouse 2 may detect the moving status of the movable platform 112 and generate a corresponding motion signal S1.

Moreover, in a case that the tested mouse 2 on testing base 111 generates the motion signal S1 in response to the movement of the movable platform 112 in the preset direction, the generation of the motion signal S1 denotes that the tested mouse 2 is operated by the user to be moved in the direction opposite to the preset direction. The operating principles of the displacement sensor of the tested mouse 2 are well known in the art, and are not redundantly described herein.

The electronic calculator 12 is electrically connected with the controlling unit 113 and the tested mouse 2. In addition, the electronic calculator 12 has a testing program 121. The testing program 121 has a data library 1211. The data about the preset speed, the preset direction and the preset distance can be acquired by the controlling unit 113 from the data library 1211. According to the preset speed, the preset direction and the preset distance, the controlling unit 113 drives a corresponding motion of the movable platform 112. Moreover, a standard vector value and a standard speed value corresponding to the preset speed, the preset direction and the preset distance may be provided to the testing program 121 by the data library 1211.

Moreover, after the motion signal S1 is generated by the tested mouse 2 in response to the movement of the movable platform 112, the motion signal S1 is transmitted to the testing program 121. According to the motion signal S1, a tested vector value and a tested speed value are acquired by the testing program 121. By comparing the tested vector value with the standard vector value or comparing the tested speed value with the standard speed value, the testing program 121 will judge whether the tested mouse 2 is qualified. For example, the operator may input the qualification criterion about the tested mouse 2 into the testing program 121. If the difference between the tested vector value and the standard vector value is lower than a first preset threshold value and the difference between the tested speed value and the standard speed value is lower than a second preset threshold value, the testing program 121 determines that the tested mouse is qualified.

However, the conventional mouse motion trajectory testing system 1 still has some drawbacks. For example, since the movable platform 112 of the testing fixture 11 need to be moved to different moving distances to meet different testing requirements, a large testing space is required to test the motion trajectory of the tested mouse. Therefore, there is a need of providing an improved mouse motion trajectory testing system to solve the above drawbacks.

SUMMARY OF THE INVENTION

The present invention relates to a mouse motion trajectory testing system, and more particularly to a mouse motion trajectory testing system requesting a smaller testing space to achieve the purpose of testing the mouse motion trajectory.

In accordance with an aspect of the present invention, there is provided a mouse motion trajectory testing system for testing a motion trajectory of a tested mouse. The mouse motion trajectory testing system includes a testing fixture and an electronic calculator. The testing fixture includes a testing base, a rotatable member and a controlling unit. The testing base is used for fixing the tested mouse thereon. The rotatable member is disposed under the testing base and rotatable around a rotation center axis. When the rotatable member is rotated around the rotation center axis, the tested mouse generates a motion signal. The controlling unit is used for driving the rotatable member to be rotated for a preset number of revolutions at a preset speed. The electronic calculator is connected to the controlling unit and the tested mouse and includes a testing program. The testing program has a data library for providing the preset speed and the preset number of revolutions to the controlling unit and providing at least one standard parameter corresponding to the preset speed and the preset number of revolutions to the testing program. After the motion signal from the tested mouse is received by the testing program, at least one tested parameter is acquired by the testing program. By comparing the at least one tested parameter with the at least one standard parameter, the testing program judges whether the tested mouse is qualified or not.

In an embodiment, the testing fixture further includes a turntable member for turning the rotatable member relative to a turntable center axis at a preset angle, wherein the turntable center axis is perpendicular to the rotation center axis.

In an embodiment, the turntable member is a turntable disc, which is electrically connected with the controlling unit. The turntable member is controlled by the controlling unit to be turned at the preset angle.

In an embodiment, the turntable disc has a central hollow portion for accommodating the rotatable member.

In an embodiment, the at least one standard parameter includes a standard vector value and a standard speed value, and the at least one tested parameter includes a tested vector value and a tested speed value.

In an embodiment, the preset speed, the preset number of revolutions and the preset angle are inputted into the data library by an operator through the electronic calculator.

In an embodiment, the tested mouse is an optical mouse.

In an embodiment, the tested mouse has an image sensor for capturing a plurality of image frames during the rotatable member is rotated. According to the image frames, the image sensor generates the motion signal.

In an embodiment, the motion trajectory of the tested mouse is tested by the mouse motion trajectory testing system in a production line of the tested mouse.

In an embodiment, the rotatable member is a roller or a ball.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a mouse motion trajectory testing system. The mouse motion trajectory testing system is applied to but is not limited to the production line of the mouse. In such way, after the mouse is assembled in a factory, the mouse motion trajectory can have good precision, and the operations of the mouse by the user can be in consistent with the operating behavior of the user.

Figure 1:
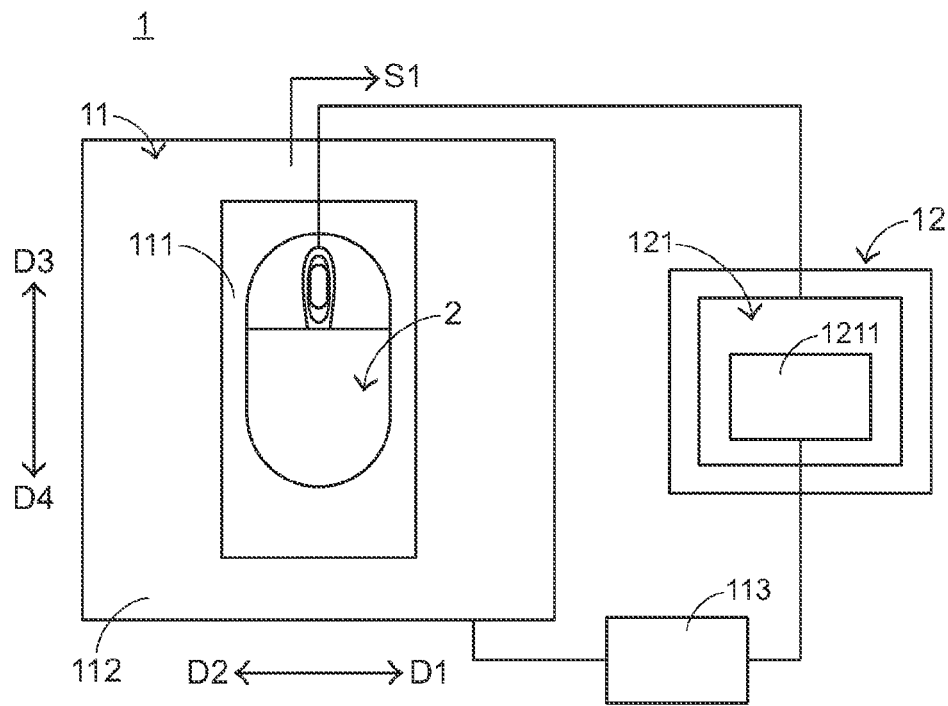
FIG. 1 schematically illustrates the architecture of a conventional mouse motion trajectory testing system.
Figure 2:
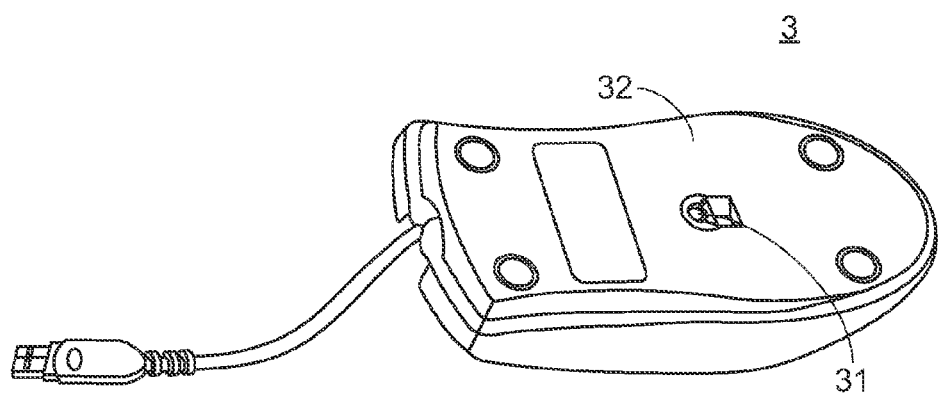
FIG. 2 schematically illustrates an optical mouse to be tested by the mouse motion trajectory testing system of the present invention.

Generally, the mouse has a sensor for detecting the moving status of the mouse and generating a corresponding motion signal according to the detecting result of the sensor. Take an optical mouse for example. FIG. 2 schematically illustrates an optical mouse to be tested by the mouse motion trajectory testing system of the present invention. As shown in FIG. 2, the optical mouse 3 has an image sensor 31. The optical sensor 31 is located at a bottom surface 32 of the optical mouse 3. During the process of moving the optical mouse 3, a plurality of image frames are captured by the image sensor 31. According to these image frames, the image sensor 31 generates a corresponding motion signal. The operating principles of the image sensor 31 are well known in the art, and are not redundantly described herein. Of course, the mouse motion trajectory testing system of the present invention is not limited to test the optical mouse. That is, the mouse motion trajectory testing system of the present invention may be employed to test a mechanical mouse (e.g. a trackball mouse) or any other suitable mouse.

Figure 3:
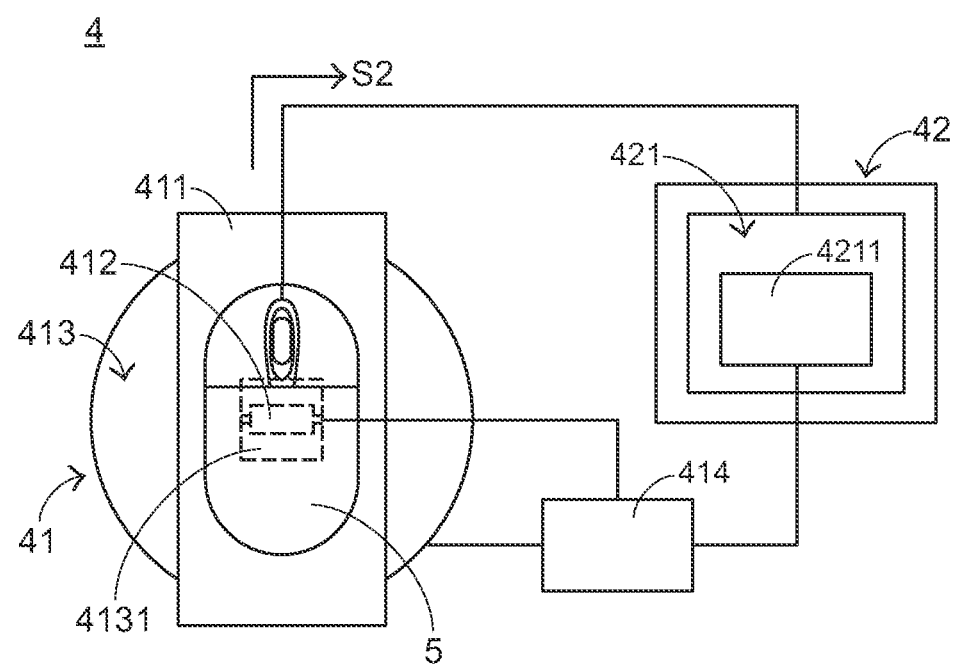
FIG. 3 is a schematic top view illustrating a mouse motion trajectory testing system according to an embodiment of the present invention.
Figure 4:
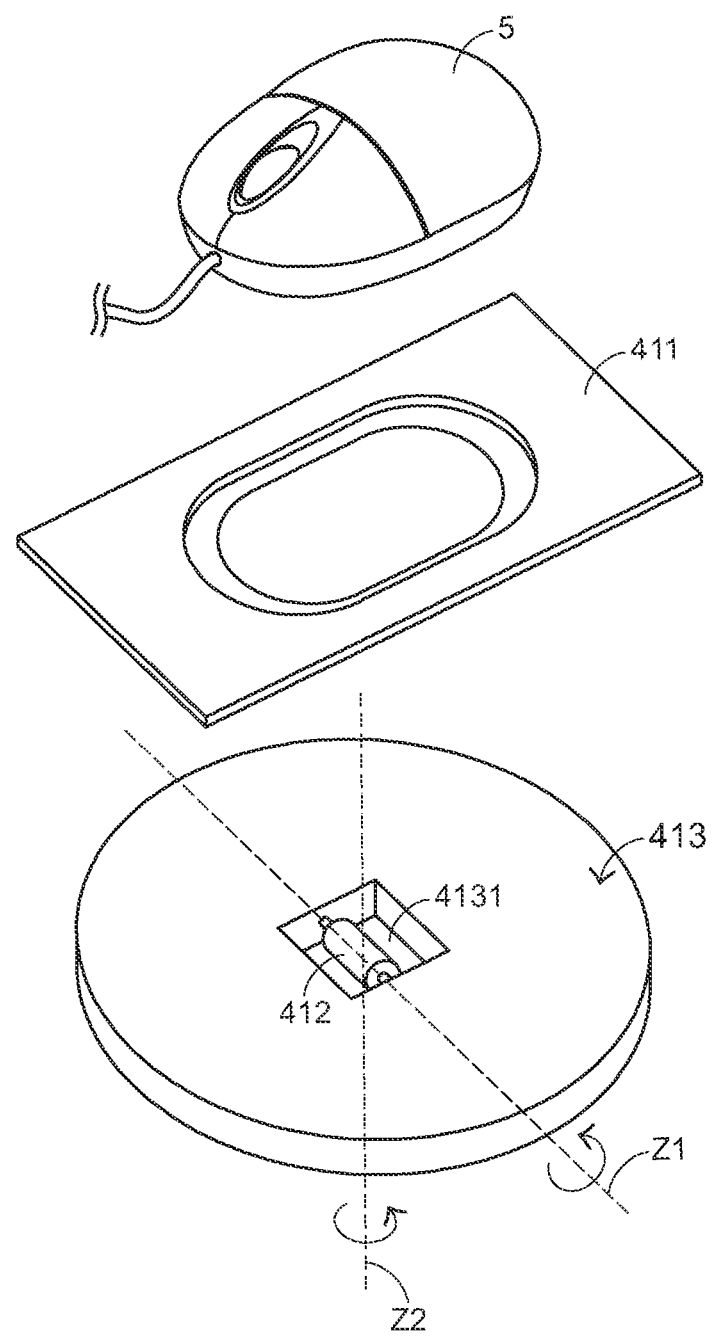
FIG. 4 is a schematic exploded view illustrating a portion of the mouse motion trajectory testing system as shown in FIG. 3.

FIG. 3 is a schematic top view illustrating a mouse motion trajectory testing system according to an embodiment of the present invention. FIG. 4 is a schematic exploded view illustrating a portion of the mouse motion trajectory testing system as shown in FIG. 3. As shown in FIGS. 3 and 4, the mouse motion trajectory testing system 4 comprises a testing fixture 41 and an electronic calculator 42. The testing fixture 41 comprises a testing base 411, a rotatable member 412, a turntable member 413 and a controlling unit 414. The testing base 411 is used for fixing a tested mouse 5 thereon. The rotatable member 412 and the turntable member 413 are disposed under the testing base 411. The rotatable member 412 is rotatable around a rotation center axis Z1. The turntable member 413 may be turned around a turntable center axis Z2. In this embodiment, the rotation center axis Z1 is perpendicular to the turntable center axis Z2.

Moreover, the controlling unit 414 is electrically connected with the rotatable member 412 and the turntable member 413 for driving the rotatable member 412 to be rotated for a preset number of revolutions and driving the turntable member 413 to be turned at a preset angle. In a case that the turntable member 413 is turned around the turntable center axis Z2 at the preset angle, the rotatable member 412 is synchronously turned at the preset angle. In this embodiment, the turntable member 413 is a turntable disc with a central hollow portion 4131. The hollow portion 4131 of the turntable disc is configured for accommodating the rotatable member 412. It is noted that the location of the rotatable member 412 relative to the hollow portion 4131 is not restricted. For example, the rotatable member 412 may be located over or under the hollow portion 4131. In this embodiment, the rotatable member 412 is a roller. Alternatively, in some embodiments, the rotatable member 412 is a ball.

It is noted that the actions of the turntable member 413 and the rotatable member 412 result in a relative motion with respect to the immobile tested mouse 5, which are disposed over the turntable member 413 and the rotatable member 412. In such way, the behavior of moving the tested mouse 5 by the user can be simulated. In response to the above relative motion, the tested mouse 5 generates a corresponding motion signal, which will be illustrated later.

The electronic calculator 42 is electrically connected with the controlling unit 414 and the tested mouse 5. In addition, the electronic calculator 42 has a testing program 421. The testing program 421 has a data library 4211. The data about the preset speed, the preset number of revolutions and the preset angle can be acquired by the controlling unit 414 from the data library 4211. Moreover, at least one standard parameter corresponding to the preset speed, the preset number of revolutions and the preset angle may be provided to the testing program 421 by the data library 4211. More preferably, the operator may input the preset speed, the preset number of revolutions and the preset angle into the data library 4211 through the electronic calculator 42. Moreover, the motion signal S2 generated by the tested mouse 5 may be transmitted to the testing program 421. According to the motion signal S2, at least one tested parameter is acquired by the testing program 421. By comparing the at least one standard parameter with the at least one tested parameter, the testing program 421 will judge whether the tested mouse 5 is qualified.

In this embodiment, the at least one standard parameter comprises a standard vector value and a standard speed value, and the at least one tested parameter comprises a tested vector value and a tested speed value. More preferably, the operator may input the qualification criterion about the tested mouse 5 into the testing program 421. If the difference between the tested vector value and the standard vector value is lower than a first preset threshold value and the difference between the tested speed value and the standard speed value is lower than a second preset threshold value, the testing program determines that the tested mouse is qualified. Of course, the at least one standard parameter, the at least one tested parameter and the qualification criterion are not restricted.

Figure 5A:
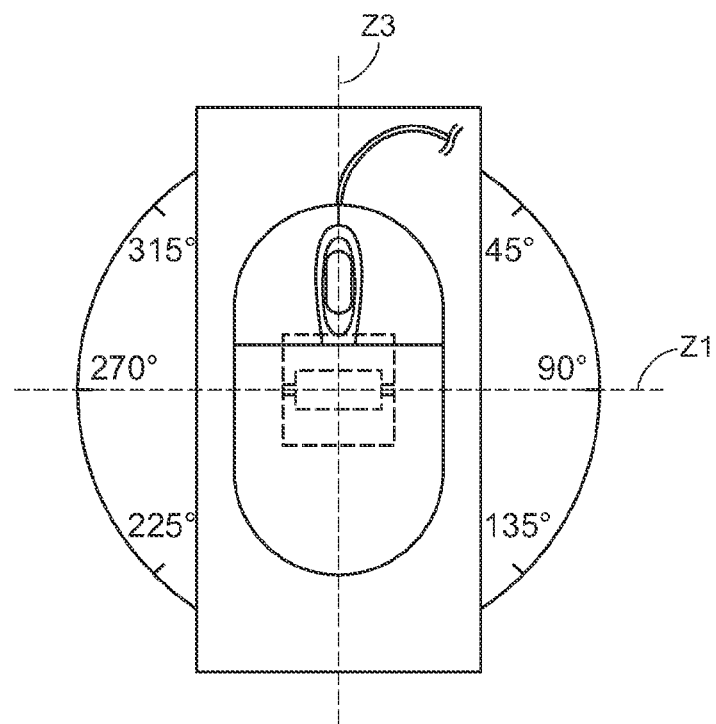
FIG. 5A schematically illustrates the mouse motion trajectory testing system before the tested mouse is tested.

FIG. 5 schematically illustrates the operation of the mouse motion trajectory testing system as shown in FIG. 3. FIG. 5A schematically illustrates the mouse motion trajectory testing system before the tested mouse is tested. Under this circumstance, the rotatable member 412 and the turntable member 413 are disabled. In addition, the rotation center axis Z1 of the rotatable member 412 is perpendicular to a central baseline Z3 of the tested mouse 5.

Figure 5B:
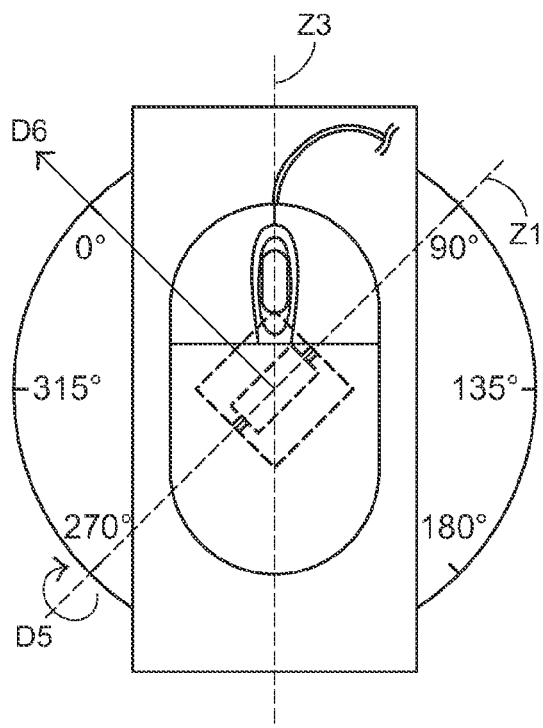
FIG. 5B schematically illustrates the mouse motion trajectory testing system during the tested mouse is tested.

FIG. 5B schematically illustrates the mouse motion trajectory testing system during the tested mouse is tested. During the process of testing the tested mouse 5 by the mouse motion trajectory testing system 4, the testing base 411 and the tested mouse 5 on the testing base 411 are immobile. That is, the central baseline Z3 of the tested mouse 5 is immobile. According to the preset angle, the turntable member 413 is turned at a 45-degree angle. Correspondingly, the rotatable member 412 is synchronously turned around the turntable center axis Z2 at a 45-degree angle. Then, the rotatable member 412 is rotated in the direction D5 for the preset number of revolutions (N) at the predetermined speed (V). Consequently, the rotatable member 412 is moved relative to the immobile tested mouse 5. In such way, the tested mouse 5 is simulated to be moved on a plane for a specified distance in the direction D6 at the predetermined speed V, wherein the direction D6 is perpendicular to the rotation center axis of the rotatable member. The specified distance is equal to the product of the preset number of revolutions (N) and the circumferential length of the rotatable member 412. After the tested mouse 5 is tested by the mouse motion trajectory testing system 4, the motion signal S2 is generated and transmitted to the testing program 421. According to the motion signal S2, the testing program 421 will judge whether the tested mouse 5 is qualified. In other words, if the tested mouse 5 complies with the qualification criterion, the tested mouse 5 generates the motion signal S2 during the tested mouse 5 is tested by the mouse motion trajectory testing system 4. Under this circumstance, the motion signal S2 denotes the motion signal in response to the movement of the tested mouse 5 on a plane for a specified distance in the direction D6 at the predetermined speed V, wherein the direction D6 is perpendicular to the rotation center axis of the rotatable member.

In some embodiments, the mouse motion trajectory testing system 4 of the present invention may be simplified. For example, the turntable member 413 is exempted from the mouse motion trajectory testing system 4. That is, an angle between the rotation center axis Z1 of the rotatable member 412 and the central baseline Z3 of the tested mouse 5 is kept unchanged. As shown in FIG. 5, the turntable member 413 of the mouse motion trajectory testing system 4 may be omitted. Under this circumstance, the rotation center axis Z1 of the rotatable member 412 is constantly located at the position as shown in FIG. 5B. In other words, before the tested mouse 5 is tested by the mouse motion trajectory testing system 4, the rotation center axis Z1 of the rotatable member 412 is located at the position as shown in FIG. 5B.

From the above description, during the tested mouse 5 is tested by the mouse motion trajectory testing system 4, the turntable member 413 may be turned around the turntable center axis Z2, and the rotatable member 412 is rotatable around the rotation center axis Z1 only within the diameter range of the turntable member 413. Consequently, during the tested mouse 5 is tested by the mouse motion trajectory testing system 4, the testing space may be reduced to the diameter range of the turntable member 413 When compared with the conventional mouse motion trajectory testing system, the mouse motion trajectory testing system of the present invention needs a smaller testing space.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse motion trajectory testing system for testing a motion trajectory of a tested mouse, said mouse motion trajectory testing system comprising:
a testing fixture comprising:
a testing base for fixing said tested mouse thereon;
a rotatable member disposed under said testing base and rotatable around a rotation center axis, wherein when said rotatable member is rotated around the rotation center axis, said tested mouse generates a motion signal; and
a controlling unit for driving said rotatable member to be rotated for a preset number of revolutions at a preset speed; and
an electronic calculator connected to the controlling unit and the tested mouse and comprising a testing program, wherein said testing program has a data library for providing said preset speed and said preset number of revolutions to said controlling unit and providing at least one standard parameter corresponding to said preset speed and said preset number of revolutions to said testing program, wherein after said motion signal from said tested mouse is received by said testing program, at least one tested parameter is acquired by said testing program, wherein by comparing said at least one tested parameter with said at least one standard parameter, said testing program judges whether said tested mouse is qualified or not.

2. The mouse motion trajectory testing system according to claim 1 wherein said testing fixture further comprises a turntable member for turning said rotatable member relative to a turntable center axis at a preset angle, wherein said turntable center axis is perpendicular to said rotation center axis.

3. The mouse motion trajectory testing system according to claim 2 wherein said turntable member is a turntable disc, which is electrically connected with said controlling unit, wherein said turntable member is controlled by said controlling unit to be turned at said preset angle.

4. The mouse motion trajectory testing system according to claim 3 wherein said turntable disc has a central hollow portion for accommodating said rotatable member.

5. The mouse motion trajectory testing system according to claim 2 wherein said at least one standard parameter comprises a standard vector value and a standard speed value, and said at least one tested parameter comprises a tested vector value and a tested speed value.

6. The mouse motion trajectory testing system according to claim 2 wherein said preset speed, said preset number of revolutions and said preset angle are inputted into said data library by an operator through said electronic calculator.

7. The mouse motion trajectory testing system according to claim 1 wherein said tested mouse is an optical mouse.

8. The mouse motion trajectory testing system according to claim 1 wherein said tested mouse has an image sensor for capturing a plurality of image frames during said rotatable member is rotated, wherein according to said image frames, said image sensor generates said motion signal.

9. The mouse motion trajectory testing system according to claim 1 wherein said motion trajectory of said tested mouse is tested by said mouse motion trajectory testing system in a production line of said tested mouse.

10. The mouse motion trajectory testing system according to claim 1 wherein said rotatable member is a roller or a ball.

* * * * *